United States Patent [19]

Persson

[11] Patent Number: 4,986,461
[45] Date of Patent: Jan. 22, 1991

[54] METHOD OF CONSTRUCTING TOOLS INTENDED FOR USE IN WORK CARRIED OUT WITH THE AID OF SHOCK-WAVE GENERATING ENERGY SOURCES

[75] Inventor: Per I. Persson, Nora, Sweden

[73] Assignee: Exploweld AB, Nora, Sweden

[21] Appl. No.: 400,938

[22] Filed: Aug. 31, 1989

[30] Foreign Application Priority Data

Sep. 6, 1988 [SE] Sweden .............................. 8803130

[51] Int. Cl.$^5$ .............................................. B23K 1/00
[52] U.S. Cl. ..................................... 228/57; 228/106; 228/107; 228/263.11; 228/263.15
[58] Field of Search .................. 228/106, 107, 263.11, 228/263.15, 57

[56] References Cited

U.S. PATENT DOCUMENTS

| | | | |
|---|---|---|---|
| 3,608,490 | 9/1971 | O'Keefe | 228/107 |
| 3,710,434 | 1/1973 | Daniels et al. | 228/131 |
| 3,868,761 | 3/1975 | Apalikov et al. | 228/107 |
| 3,893,222 | 7/1975 | Ballinger | 228/107 |
| 4,133,471 | 1/1979 | Niwatukino | 228/107 |
| 4,391,403 | 7/1983 | Persson | 228/107 |
| 4,641,775 | 2/1987 | Lande et al. | 228/107 |

*Primary Examiner*—Stephen J. Lechert, Jr.
*Assistant Examiner*—Leon Nigohosian, Jr.
*Attorney, Agent, or Firm*—Nies, Kurz, Bergert & Tamburro

[57] ABSTRACT

When working material with the aid of shock-wave generating energy sources, the problem of tool fatigue occurs.

This problem is reduced to a great extent by means of the inventive method, which prevents the occurrence of reflected tensile-force waves. This is achieved by permitting the pressure wave to pass into contact with porous material applied to the tool material, so that wave energy will be consumed by interference and heat generation in the porous material.

6 Claims, 1 Drawing Sheet

METHOD OF CONSTRUCTING TOOLS INTENDED FOR USE IN WORK CARRIED OUT WITH THE AID OF SHOCK-WAVE GENERATING ENERGY SOURCES

BACKGROUND OF THE INVENTION

Shock-wave energy sources, such as explosive, gun powder, explosive gas, electric spark discharges or magnetic fields are used in a number of known ways to carry out useful work, such as the welding, moulding or compaction of metal and other material for instance.

One of the most serious problems with all of these working methods is that the tool has a short useful life.

The material from which the tool is made rapidly becomes fatigued, as a result of the shock wave which passes into the tool and which is reflected back from the free surfaces of the tool in the form of a tensile force wave.

Although the majority of materials from which such tools are made can withstand very high compaction forces, they are more sensitive to tensile forces.

SUMMARY OF THE INVENTION

The present invention provides method which eliminates or at least reduces the effect of the reflected tensile force wave, thereby considerably lengthening the useful life of the tool.

It is the inventor's experience that when shock waves pass into porous material, the waves are broken down by interference and reflection from the walls of the cavities present in the porous material. Reflection from the free surface of the porous material almost never occurs. When such reflection is cosidered theoretically, it is seen that the pressure amplitude is very low and that the pulse rise-time is very long in comparison with corresponding values obtained with a homogenous material, these phenomena being due to the loss of energy that occurs and to the radically split waveform. This is exemplified by the fact that no success is acheived when testing porous materials with ultrasonic sound, due to the fact that no reflex is obtained.

As indicated in the introduction, a pressure wave which enters a homogenous materail is reflected in the form of a tensile-force wave by the free surface of the material, i.e. the boundary surface against a lighter material. If the material borders on a material which has the same shock-wave impedance (= density × the speed of light) the pressure wave will naturally continue to propagate and pass into the material, with no reflection taking place.

The present invention is based on the concept of placing in contact with the tool material a porous material which has approximately the same density as the tool material, so that the pressure wave will pass into the porous material and therein break down.

This eliminates the occurrence of reflection and movement, or tensile stresses, in the tool material.

The inventor is aware that by constructing a material laminate which exhibits a gradually changing shock-wave impedance, it is possible to eliminate powerful reflection of the wave from the free surface and instead obtain a sequence of reflections of low amplitude.

This method, however, is expensive and results in a much clumsier construction than the inventive constuction.

In accordance with the invention, the porous material used comprises several layers of spheres which are made of the same material as or a heavier material than the material from which the tool material is made. For example, if the tool material is steel, steel spheres can be used in the porous material.

A similar effect can be achieved by using, as the porous material, a multi-wire layer construction instead of spheres.

The tool construction in which spheres are used as the porous material has been found to give a better effect, however.

Further novel features and other objects of this invention will become apparent from the followinng detailed description, discussion and the appended claims taken in conjunction with the accompanying drawings.

BRIEF DESCRIPTION OF DRAWING

Preferred embodiments of this invention are disclosed in the accompanying drawings, in which.

DESCRIPTION OF THE ILLUSTRATED EMBODIMENTS

Figure 1:
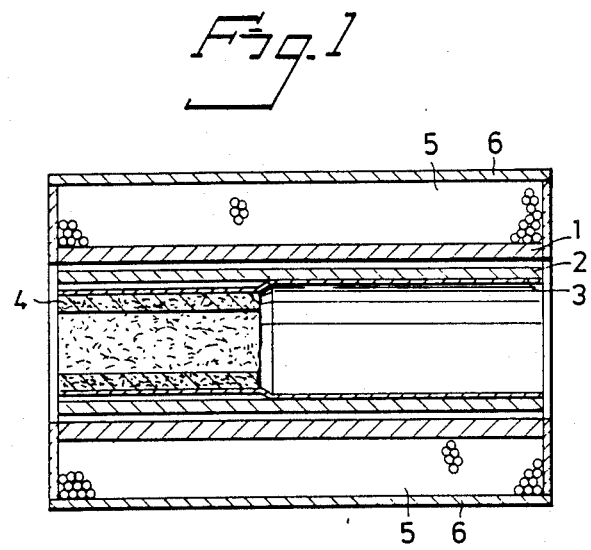
FIG. 1 illustrates the invention when applied to explosion welding techniques.

FIG. 1 illustrates a principle application of the invention in explosion welding (internal lining of tubes or pipes), in which the reference 1 identifies the actual tool material the reference 2 identifies the base tube or pipe workpiece, and the reference 3 identifies the tube lining. The reference 4 identifies the explosive charge which accelerates the tube lining 3 against the inner surface of the tube or pipe 2, so as to obtain an explosion-welding bond. The reference 5 identifies several layers of steel spheres which with the adjacent cavities are contained in a container 6 and will provide the porous material of the compound too.

Figure 2:
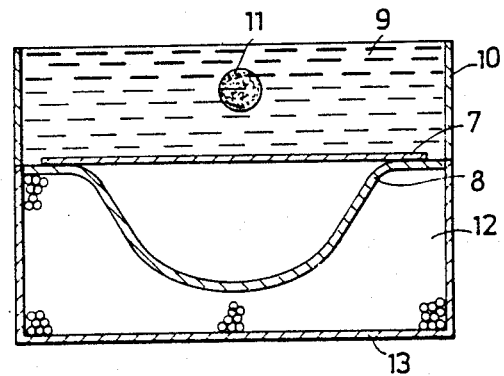
FIG. 2 illustrates the invention when applied to moulding tehniques.

FIG. 2 illustrates the application of the invention in explosion moulding. In the case of this application, a workpiece 7 is placed on top of a tool material 8. With the aid of a water mass 9 contained in a water vessel 10, a shock-wave pulse is transmitted from an explosive charge 11 to the workpiece 7, which as a result is urged down into a mould cavity in the tool material. The reference 12 identifies an arrangement of steel spheres contained in a container 13 and providing the porous material of the compound tool.

In the case of the illustrated examples, the steel spheres are packed into the countainer 6; 13 and the cavities defined between adjacent spheres are air-filled.

The steel spheres may alternatively be embedded in a plastic material or some other material having low shock-wave impedance. However, the lighter the medium contained in the cavities between the spheres, the more effectively energy is drained from the shock wave; this applies in particular to a gaseous medium, which becomes compresed and converts pressure energy into heat.

In FIG. 1, the explosive charge 4, which initially covered the whole of the inner surface of the plate-lining tube, has been shown to have burned somewhat, from right to left in FIG. 1.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method for the construction and manufacture of a compound tool which is intended to carry out work with the aid of shock-wave generating energy sources, wherein the tool includes tool material and porous material, comprising the steps of bringing said porous material into contact with said tool material, and providing that said porous material has approximately the same shock wave impedance as said tool material, thereby enabling a shock wave induced in said tool material to pass over into said porous material.

2. A method according to claim 1, wherein said porous material comprises a plurality of bodies so configured as to provide cavities therebetween when said bodies are packed together.

3. A method according to claim 2, further comprising the step of providing that said cavities are filled with a gas.

4. A method according to claim 2, further comprising the step of providing that said cavities are filled with air.

5. A method according to claim 2, further comprising the step of providing that said cavities of said porous material are filled with a solid material of lower density than that of the material from which said porous material bodies are composed.

6. A method according to claim 5 wherein the solid material provided to fill said cavities is a plastic material.

* * * * *